(12) United States Patent
Fujiwara

(10) Patent No.: US 8,814,438 B2
(45) Date of Patent: Aug. 26, 2014

(54) ROLLING BEARING CAGE, AND ROLLING BEARING INCLUDING THE SAME

(71) Applicant: JTEKT Corporation, Osaka (JP)

(72) Inventor: Hideki Fujiwara, Kitakatsuragi-gun (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/899,012

(22) Filed: May 21, 2013

(65) Prior Publication Data

US 2013/0315521 A1 Nov. 28, 2013

(30) Foreign Application Priority Data

May 28, 2012 (JP) ................. 2012-120856
Jan. 11, 2013 (JP) ................. 2013-003577
Jan. 29, 2013 (JP) ................. 2013-014641

(51) Int. Cl.
*F16C 33/50* (2006.01)

(52) U.S. Cl.
USPC ........................................... 384/578

(58) Field of Classification Search
CPC ...... F16C 33/3812; F16C 33/46; F16C 33/50; F16C 33/502; F16C 33/504; F16C 33/506; F16C 33/508
USPC .................... 384/572, 573, 578, 579
See application file for complete search history.

(56) References Cited

U.S. PATENT DOCUMENTS

| 922,288 | A | | 5/1909 | Kaye | |
|---|---|---|---|---|---|
| 1,966,266 | A | * | 7/1934 | Skelly | 384/573 |
| 2,723,886 | A | * | 11/1955 | Warshaw | 384/44 |
| 3,219,398 | A | * | 11/1965 | Anderson | 384/44 |
| 3,704,919 | A | | 12/1972 | Titt | |
| 3,964,802 | A | * | 6/1976 | Pitner | 384/44 |
| 2010/0111459 | A1 | | 5/2010 | Yasuda | |
| 2012/0082409 | A1 | | 4/2012 | Miyachi | |

FOREIGN PATENT DOCUMENTS

| DE | 103 822 | 7/1899 | |
|---|---|---|---|
| DE | 105 074 | 8/1899 | |
| DE | 180 937 | 3/1905 | |
| DE | 10 2006 030314 A1 | 1/2008 | |
| DE | 102008027082 A1 * | 12/2009 | ............ F16C 33/50 |
| DE | 10 2008 034922 A1 | 2/2010 | |
| FR | 378 052 | 9/1907 | |
| FR | 486 498 | 4/1918 | |
| GB | 03135 | 11/1907 | |
| JP | A-2006-283938 | 10/2006 | |
| JP | A-2008-256168 | 10/2008 | |
| JP | A-2012-077882 | 4/2012 | |

OTHER PUBLICATIONS

Extended European Search Report issued in European Application No. EP 13168682.6 dated Oct. 22, 2013.

* cited by examiner

*Primary Examiner* — Phillip A Johnson
(74) *Attorney, Agent, or Firm* — Oliff PLC

(57) ABSTRACT

A rolling bearing cage includes: multiple rod members each of which is provided between adjacent two of multiple rolling elements that are arranged in a circumferential direction of a rolling bearing; and multiple coupling members each of which couples corresponding two of the rod members, which are adjacent to each other in the circumferential direction. Each of the coupling members is configured to be pivotable about an axis of a corresponding one of the rod members, which is connected to the coupling member, the axis extending in a longitudinal direction of the rod member, such that a relative angle between corresponding two of the coupling members, which are adjacent to each other in the circumferential direction, is adjustable.

16 Claims, 13 Drawing Sheets

ROLLING BEARING CAGE, AND ROLLING BEARING INCLUDING THE SAME

INCORPORATION BY REFERENCE

The disclosure of Japanese Patent Applications No. 2012-120856 filed on May 28, 2012, No. 2013-003577 filed on Jan. 11, 2013 and No. 2013-014641 filed on Jan. 29, 2013 each including the specification, drawings and abstract, is incorporated herein by reference in its entirety.

BACKGROUND OF THE INVENTION

1. Field of the Invention

The invention relates to a cage that is suitable for use in, for example, a rolling bearing used to support a main shaft of a wind power generator, and relates also to a rolling bearing including the cage.

2. Description of Related Art

A tapered roller bearing is an example of a rolling bearing that is used to support a main shaft of a wind power generator, and a pin-type cage may be used as a cage of the tapered roller bearing (see, for example, Japanese Patent Application Publication No. 2008-256168 (JP 2008-256168 A)). The pin-type cage includes a pair of cage rings arranged on respective axial sides of tapered rollers, and a plurality of pins arranged at intervals in the circumferential direction and coupled at their respective ends to the cage rings. By passing the pins through through-holes formed along the central axes of the tapered rollers, the intervals between the tapered rollers in the circumferential direction are maintained.

A rolling bearing used to support a main shaft of a wind power generator has a large diameter of approximately 1 to 2 m, and is very large and heavy. Therefore, in recent years, a synthetic resin cage, which contributes to weight reduction of a rolling bearing, has been utilized instead of a pin-type cage. However, the larger a synthetic resin cage is, the more difficult it is to form the entirety of the cage as a single-piece member. Therefore, a split cage formed of a plurality of split pieces arranged in the circumferential direction is usually used (see, for example, Japanese Patent Application Publication No. 2012-77882 (JP 2012-77882 A)).

When the above-described pin-type cage is used, the sliding surfaces of the pins and the sliding surfaces of the tapered rollers, which define the through-holes, require grease lubrication. However, grease does not easily reach the inner part of each though-hole, and therefore the work for supplying the grease is very cumbersome. In addition, it is difficult to handle a large-sized pin-type cage, for example, it is difficult to store and transport the large-sized pin-type cage. On the other hand, it is not so difficult to lubricate and handle a synthetic resin split cage. However, it is somewhat difficult to assemble a rolling bearing including the synthetic resin split cage. That is, in order to assemble the rolling bearing, tapered rollers are fitted into pockets of the cage with split pieces of the cage arranged in a circular manner on the radially outer side of an inner ring. However, because the cage is formed of the split pieces, the pieces of the cage are easily removed from the outer periphery of the inner ring, and, at the same time, the tapered rollers are also easily removed from the inner ring. In addition, it is not possible to enhance commonality of split cage components among rolling bearings having different outside diameters, and it is also difficult to enhance commonality of pin-type cage components other than pins. Therefore, it is difficult to achieve cost reduction through commonality of components among rolling bearings having different outside diameters.

SUMMARY OF THE INVENTION

It is an object of the invention to provide a rolling bearing cage that contributes to facilitation of assembly of a rolling bearing, that is easily handled, for example, transported, and that allows commonality of cage components among rolling bearings having different outside diameters, and to provide a rolling bearing including the rolling bearing cage.

An aspect of the invention relates to a rolling bearing cage, including: multiple rod members each of which is provided between adjacent two of multiple rolling elements that are arranged in a circumferential direction of a rolling bearing; and multiple coupling members each of which couples corresponding two of the rod members, which are adjacent to each other in the circumferential direction. Each of the coupling members is configured to be pivotable about an axis of a corresponding one of the rod members, which is connected to the coupling member, the axis extending in a longitudinal direction of the rod member, such that a relative angle between corresponding two of the coupling members, which are adjacent to each other in the circumferential direction, is adjustable.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
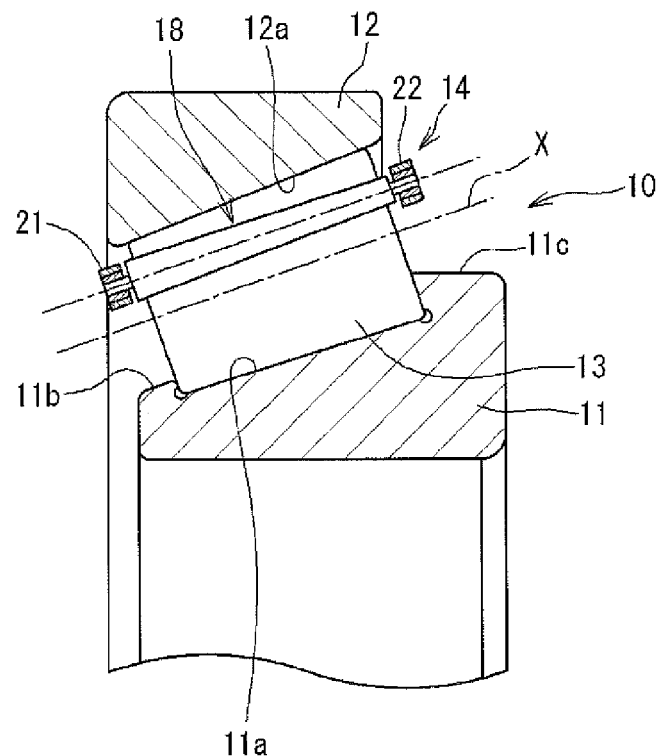
FIG. 1 is an axial sectional view of part of a rolling bearing according to a first embodiment of the invention.
Figure 2:
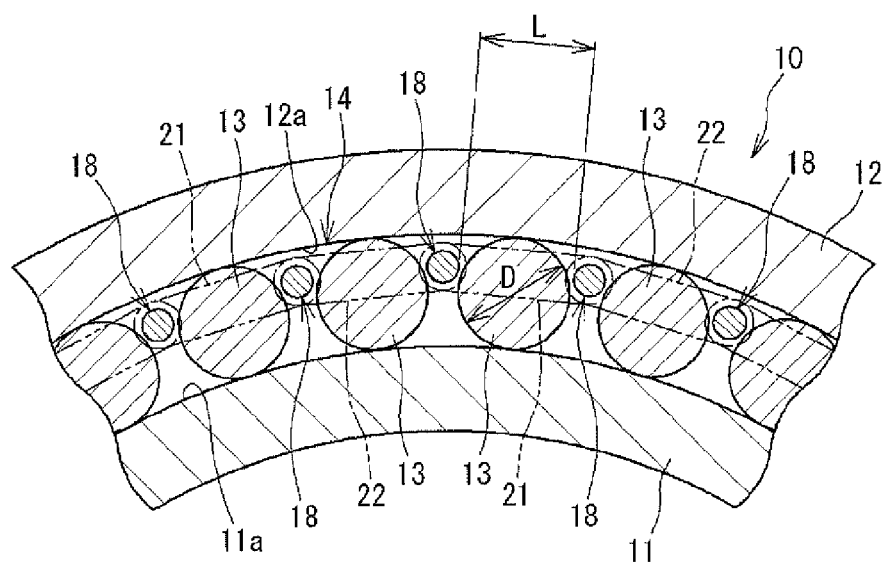
FIG. 2 is a cross-sectional view of part of the rolling bearing according to the first embodiment of the invention.

Hereinafter, embodiments of the invention will be described with reference to the accompanying drawings. FIG. 1 is an axial sectional view of part of a rolling bearing 10 according to a first embodiment of the invention. FIG. 2 is a cross-sectional view of part of the rolling bearing 10. The rolling bearing 10 according to the present embodiment is used to support, for example, a main shaft of a wind power generator. The rolling bearing 10 includes an annular inner ring 11, an annular outer ring 12, a plurality of rolling elements 13, and a cage 14. The outer ring 12 is arranged radially outward of the inner ring 11. The rolling elements 13 are arranged in the circumferential direction, at positions between the inner ring 11 and the outer ring 12. The cage 14 maintains the intervals between the rolling elements 13 in the circumferential direction.

The inner ring 11 has an inner ring raceway 11a, a small rib portion 11b and a large rib portion 11c. The inner ring raceway 11a is formed in a tapered shape. The small rib portion 11b and the large rib portion 11c are formed on respective axial sides of the inner ring raceway 11a, and protrude radially outward from the inner ring raceway 11a. The outer ring 12 has an outer ring raceway 12a formed in a tapered shape. Each of the rolling elements 13 is a tapered roller formed in truncated cone shape, and is rollable on the inner ring raceway 11a and the outer ring raceway 12a. An axial movement of the rolling elements 13 is restricted by the small rib portion 11b and the large rib portion 11c.

Figure 3:
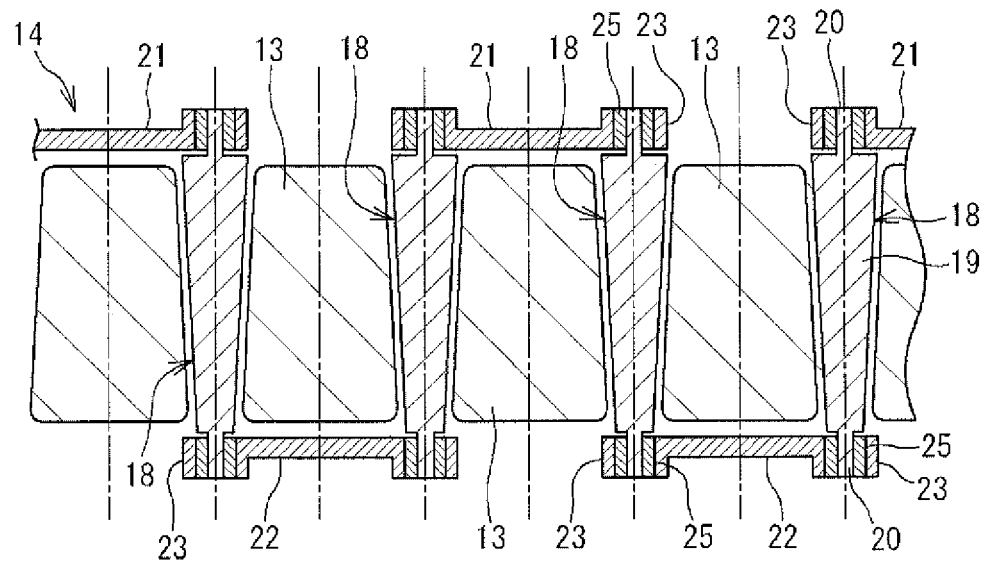
FIG. 3 is a sectional view for illustrating the relationship between tapered rollers and a cage according to the first embodiment of the invention.
Figure 4:
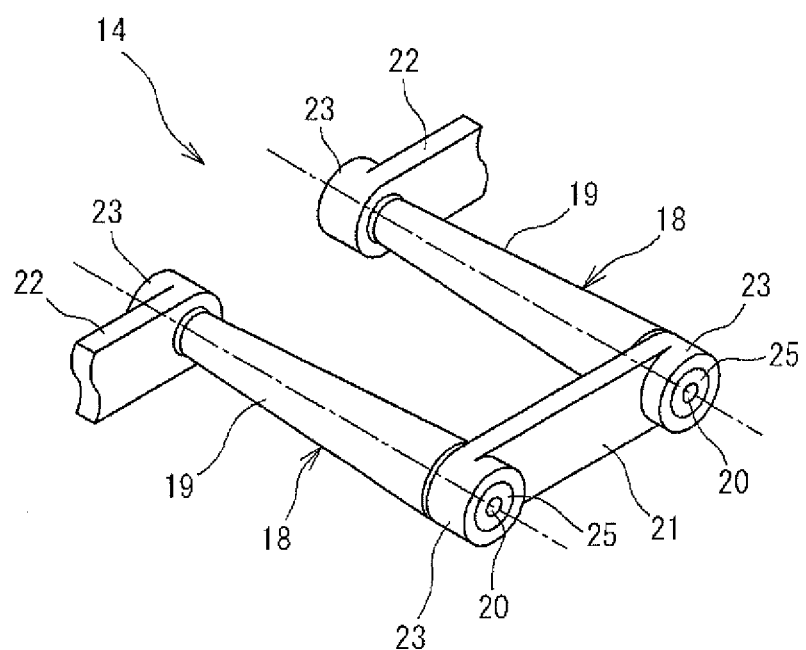
FIG. 4 is a partial perspective view of the cage according to the first embodiment of the invention.

FIG. 3 is a sectional view that illustrates the relationship between the rolling elements and the cage. FIG. 4 is a partial perspective view of the cage. The cage 14 includes a plurality of pins (rod members) 18 and a plurality of coupling links (coupling members) 21, 22. The pins 18 are arranged between the rolling elements 13 arranged in the circumferential direction. Each of the coupling links 21, 22 couples corresponding two of the pins 18, which are adjacent to each other in the circumferential direction. The cage 14 is formed in an annular shape as a whole. Each of the pins 18 has an elongate body portion 19 and shaft portions 20 formed at respective axial ends of the body portion 19.

The body portion 19 is formed in a tapered shape with an outer periphery that is generally along the generating line of each tapered roller. The shaft portions 20 are formed so as to be coaxial with the body portion 19 and smaller in outside diameter than the body portion 19. As shown in FIG. 1, in the rolling bearing 10, the pins 18 are arranged radially outward of the centers (axes) X of the rolling elements (tapered rollers) 13 arranged between the inner ring 11 and the outer ring 12. In addition, as shown in FIG. 2, a distance L between any two of the pins 18, which are adjacent to each other in the circumferential direction, is substantially equal to or slightly smaller than a diameter D of the rolling element 13 arranged therebetween, and the distance L is set to such a value that a slight clearance is formed between the rolling element 13 and each of the two pins 18.

As shown in FIG. 3 and FIG. 4, the coupling links 21, 22 include first coupling links 21 and second coupling links 22. Each of the first coupling links 21 couples the one longitudinal end portions of the adjacent pins 18. Each of the second coupling links 22 couples the other longitudinal end portions of the adjacent pins 18. The first coupling links 21 and the second coupling links 22 are arranged alternately in the circumferential direction. Thus, the first coupling link 21 is coupled to the one end portion of each pin 18, and the second coupling link 22 is coupled to the other end portion of each pin 18.

Each of the first coupling links 21 and the second coupling links 22 is formed of a substantially ellipsoidal plate member, and has cylindrical boss portions 23 at its respective longitudinal end portions. The shaft portion 20 is rotatably inserted in each boss portion 23 via a bush 25. The first and second coupling links 21, 22 that are adjacent to each other in the circumferential direction, that is, in the present embodiment, the first coupling link 21 coupled to the one longitudinal end of one of the pins 18 and the second coupling link 22 coupled to the other longitudinal end portion of the one of the pins 18, are pivotable about the axis of the one of the pins 18 (i.e., the relative angle between the first coupling link 21 and the second coupling link 22 is adjustable). Thus, the shape of the cage 14 is changed as the coupling links 21, 22 pivot about the axis of each pin 18.

The cage 14 according to the present embodiment includes the pins 18 provided between the rolling elements 13 arranged in the circumferential direction and the coupling links 21, 22, each of which couples the pins 18 that are adjacent to each other in the circumferential direction. Thus, the intervals between the rolling elements 13 are appropriately maintained by the pins 18. Because each pin 18 is rotatably coupled to the coupling links 21, 22, it is possible to reduce friction resistance due to contact with the rolling element 13. As a result, it is possible to suppress abrasion of the rolling elements 13 and the pins 18.

The cage 14 is formed in an annular shape as a whole. Therefore, during assembly of the rolling bearing 10, the cage 14 is less likely to be removed from the outer periphery of the inner ring 11. At the same time, the rolling elements 13 retained by the cage 14 are less likely to be removed from the inner ring 11. In the cage 14, the first coupling links 21 and the second coupling links 22 are provided alternately in the circumferential direction. Thus, the number of the coupling links 21, 22 is smaller than that in the case where the first coupling links 21 are consecutively provided in the circumferential direction and the second coupling links 22 are consecutively provided in the circumferential direction (in the case of a second embodiment described later). As a result, it is possible to reduce the weight of the rolling bearing and the cost for the rolling bearing.

In the rolling bearing 10, the pins 18 are arranged radially outward of the axes (centers) of the tapered rollers, and the distance L between the pins 18 adjacent to each other in the circumferential direction is substantially equal to or smaller than the diameter D of the rolling element 13 arranged therebetween. Thus, during assembly of the rolling bearing 10, the rolling elements 13 are retained while being fitted to the inner ring 11 even if the outer ring 12 is not mounted.

The body portion 19 of each pin 18 according to the present embodiment is formed in a tapered shape with the outer periphery that is generally along the generating line of each tapered roller. Thus, each pin 18 substantially uniformly contacts the outer peripheries of corresponding two of the tapered rollers 13. Therefore, it is possible to prevent partial abrasion of the tapered rollers 13 or the body portions 19 and a skew of the tapered rollers 13.

In the present embodiment, by adjusting the number of the pins 18 and the number of the coupling links 21, 22, it is possible to form the cages 14 having different outside diameters. Thus, it is possible to achieve commonality of the pins 18 and coupling links 21, 22 among the rolling bearings 10 that have different outside diameters and that include the common rolling elements 13. Thus, it is possible to reduce manufacturing cost.

To assemble the rolling bearing 10 according to the present embodiment, for example, one of the pins 18 of the cage 14 and the coupling link 21 or 22 coupled to the one of the pins 18 are separated from each other to form the cage 14 into a linear shape (strap shape), and then the cage 14 is wound around the outer periphery of the inner ring 11 while the rolling elements 13 are sequentially arranged on the inner ring raceway 11a. Finally, by coupling the pin 18 and the coupling link 21 or 22, which have been separated from each other, to form the cage 14 into an annular shape, the rolling elements 13 and the cage 14 are mounted on the inner ring 11. After that, by arranging the outer ring 12 on the radially outer side of the rolling elements 13, the rolling bearing 10 is completed.

Figure 5:
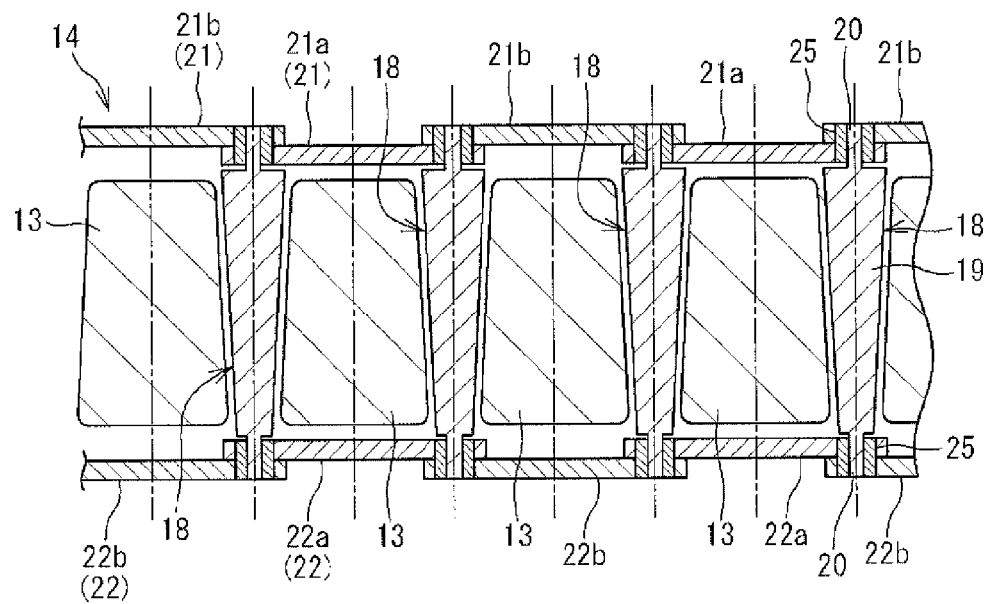
FIG. 5 is a sectional view for illustrating the relationship between tapered rollers and a cage according to a second embodiment of the invention.
Figure 6:
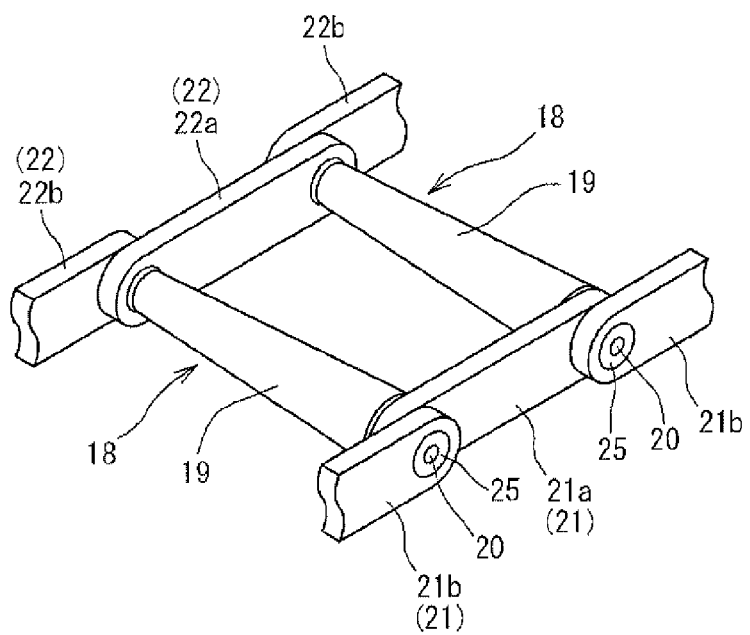
FIG. 6 is a partial perspective view of the cage according to the second embodiment of the invention.

FIG. 5 is a sectional view that illustrates the relationship between rolling elements and a cage according to the second embodiment of the invention. FIG. 6 is a partial perspective view of the cage. In the present embodiment, the first coupling links 21 coupled to one longitudinal end portions of the pins 18 are provided consecutively in the circumferential direction and the second coupling links 22 coupled to the other longitudinal end portions of the pins 18 are provided consecutively in the circumferential direction. The first coupling links 21 include inner coupling links 21a and outer coupling links 21b arranged axially outward of the inner coupling links 21a. The second coupling links 22 include inner coupling links 22a and outer coupling links 22b arranged axially outward of the inner coupling links 22a. The inner coupling links 21a, 22a and the outer coupling links 21b, 22b are arranged alternately in the circumferential direction. In addition, the inner coupling links 21a of the first coupling links 21 and the inner coupling links 22a of the second coupling links 22 are arranged to face each other in the axial direction. The outer coupling links 21b of the first coupling links 21 and the outer coupling links 22b of the second coupling links 22 are arranged to face each other in the axial direction. One of the shaft portions 20 of each pin 18 is rotatably inserted in the corresponding inner coupling link 21a and the corresponding outer coupling link 21b via the bush 25. The other one of the shaft portions 20 of each pin 18 is rotatably inserted in the corresponding inner coupling link 22a and the corresponding outer coupling link 22b via the bush 25.

In the present embodiment, the first and second coupling links 21, 22 are respectively arranged consecutively in the circumferential direction. Therefore, it is possible to make the strength of the cage 14 according to the second embodiment higher than that of the cage 14 according to the first embodiment. On the other hand, the number of the coupling links 21, 22 is twice as large as that in the first embodiment, resulting in an increase in the weight of the rolling bearing and an increase in the cost for the rolling bearing. Therefore, in this respect, the first embodiment is advantageous over the second embodiment.

Figure 7:
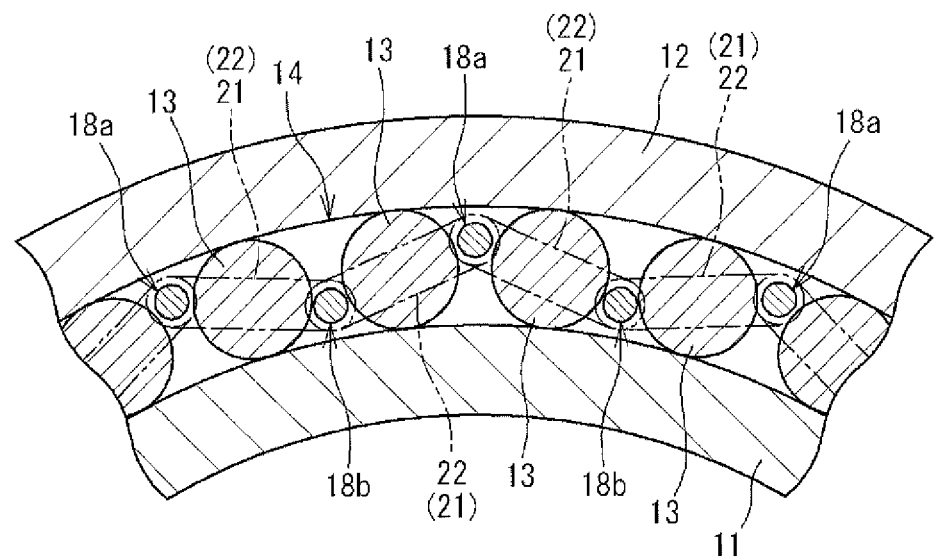
FIG. 7 is a cross-sectional view of part of a rolling bearing according to a third embodiment of the invention.

FIG. 7 is a cross-sectional view of part of a rolling bearing according to a third embodiment of the invention. The cage 14 according to the present embodiment includes pins (outer pins) 18a and pins (inner pins) 18b that are arranged alternately in the circumferential direction. The outer pins 18a are arranged radially outward of the centers of the tapered rollers 13, and the inner pins 18b are arranged radially inward of the centers of the tapered rollers 13. The first coupling links 21 and the second coupling links 22 are arranged in a zigzag manner in the radial direction. The first coupling links 21 and the second coupling links 22 may be provided alternately in the circumferential direction as in the first embodiment or may be respectively provided consecutively in the circumferential direction as in the second embodiment. The other configuration is similar to those of the above-described embodiments, so the detailed description thereof is omitted.

Figure 10:
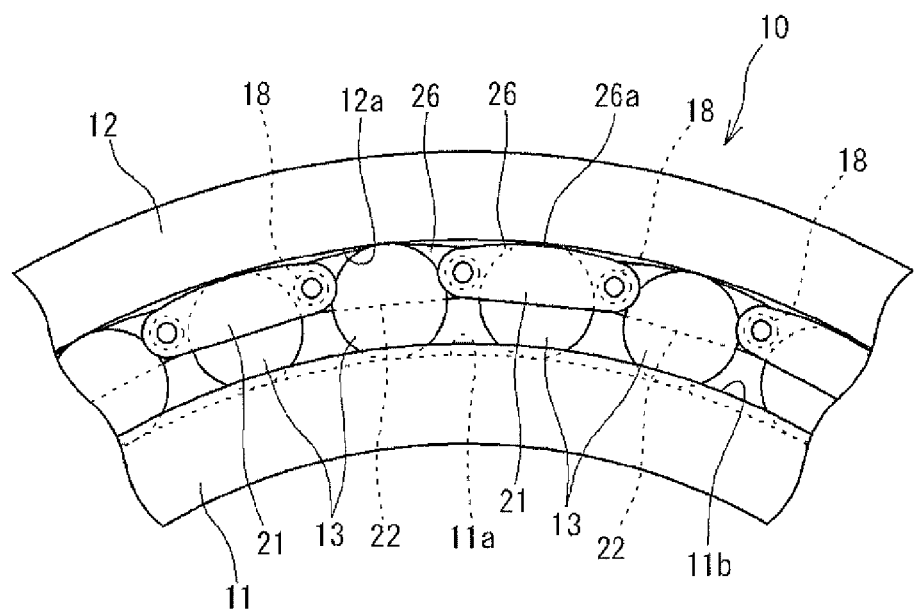
FIG. 10 is a side view of part of a rolling bearing according to a fourth embodiment of the invention.

FIG. 10 is a side view of part of a rolling bearing according to a fourth embodiment of the invention. In the present embodiment, the cage 14 has movement a restricting unit that restricts radial movement of the coupling links 21, 22. Specifically, the movement restricting unit includes guided portions 26 formed in the coupling links 21, 22 of the cage 14. The guided portions 26 are formed by making the radially outer faces of the coupling links 21, 22 bulge (protrude) radially outward, and are arranged with slight clearances left between the guided portions 26 and the outer ring raceway 12a of the outer ring 12.

During rotation of the rolling bearing 10, outer peripheries (sliding surfaces) 26a of the guided portions 26 slide with respect to the outer ring raceway 12a. Thus, radially outward movement of the coupling links 21, 22 is restricted. In addition, because radially outward movement of the coupling links 21, 22 is restricted by the guided portions 26, radially inward movement of other coupling links 21, 22 that are located at positions offset from the above-mentioned coupling links 21, 22 by 180° is restricted. In addition, in the rolling bearing 10, the pins 18 are arranged radially outward of the center lines X (see FIG. 1) of the rolling elements 13. Therefore, radially inward movement of the pins 18 is restricted by the rolling elements 13. Thus, the amount of radial movement of the cage 14 is reduced. As a result, it is possible to suppress occurrence of vibrations due to rotation of the rolling bearing 10.

In addition, the sliding surface 26a of each guided portion 26 is formed in a circular arc surface that bulges outward in the radial direction. Thus, it is possible to suppress occurrence of abrasion by reducing contact pressure that acts on the outer ring raceway 12a. In the embodiment shown in FIG. 10, the circular arc diameter of each sliding surface 26a is smaller than the inside diameter of the outer ring raceway 12a. Alternatively, the circular arc diameter of each sliding surface 26a may be substantially equal to the inside diameter of the outer ring raceway 12a. In this case, it is possible to further reliably suppress occurrence of abrasion by increasing the area of contact with the outer ring raceway 12a.

Surface treatment (friction reducing treatment) may be applied to the sliding surface 26a of each guided portion 26 in order to reduce friction resistance of the sliding surface 26a against the outer ring raceway 12a. By applying such surface treatment, it is possible to reduce the rotation load of the rolling bearing 10. The surface treatment may be, for example, phosphating using manganese phosphate, or the like, diamond-like carbon (DLC) coating, or soft nitriding process.

Figure 11:
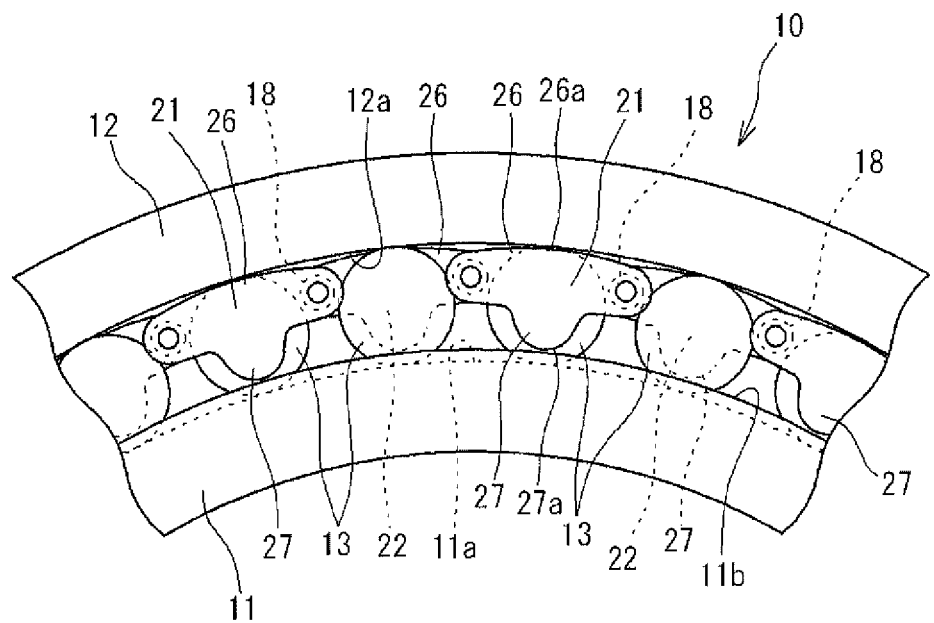
FIG. 11 is a side view of part of a rolling bearing according to a modified example of the fourth embodiment of the invention.

FIG. 11 is a side view of part of a rolling bearing that shows a modified example of the fourth embodiment of the invention. In the fourth embodiment shown in FIG. 10, the guided portions 26 that constitute the movement restricting unit are formed at the radially outer side portions of the coupling links 21, 22. Alternatively, in the present modified example, the movement restricting unit has, in addition to the guided portions 26, guided portions 27 formed at the radially inner side portions of the coupling links 21, 22. The guided portions 27 project toward the inner ring 11. The distal end (radially inner end) of each guided portion 27 is formed in a circular arc shape. The guided portions 27 are arranged with slight clearances left between the guided portions 27 and the rib portions 11b, 11c of the inner ring 11. The distal end surfaces of the guided portions 27 serve as sliding surfaces 27a that are slidable with respect to the rib portions 11b, 11c of the inner ring 11.

According to the present modified example, during rotation of the rolling bearing 10, the sliding surfaces 27a of the guided portions 27 slide with respect to the outer peripheries of the rib portions 11b, 11c of the inner ring 11. In this way, radially inward movement of the coupling links 21, 22 is restricted. Thus, it is possible to further reliably suppress occurrence of vibrations due to rotation of the rolling bearing 10.

The coupling links 21, 22 are arranged so as to be farther from the inner ring 11 than from the outer ring 12. Therefore, each guided portion 27 has a larger radial size than that of each guided portion 26. However, each guided portion 27 has a smaller circumferential size than that of each guided portion 26. Thus, it is possible to suppress an increase in the weight of the coupling links 21, 22 due to formation of the guided portions 27. In the present modified example, only the guided portions 27 may be formed in the coupling links 21, 22 and the guided portions 26 may be omitted.

Figure 14A:
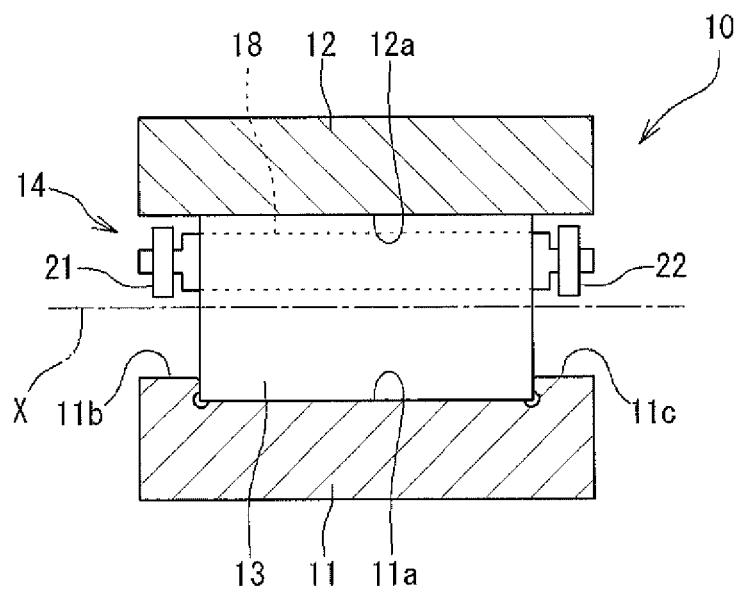
FIG. 14A and FIG. 14B are axial sectional views that respectively show examples of rolling bearings to which the invention is applicable.
Figure 14B:
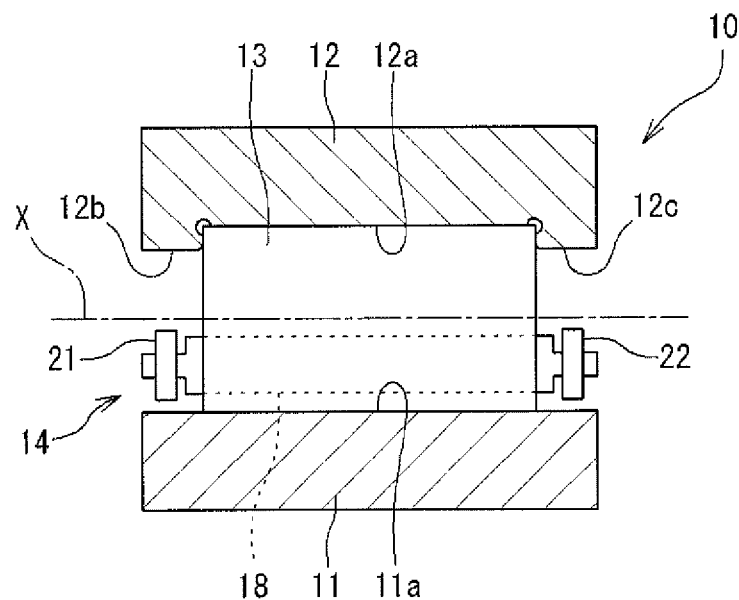

The cage 14 according to the above-described embodiments may be applied not only to the tapered roller bearing 10 shown in FIG. 1 but also to a cylindrical roller bearing 10 having the rib portions 11b, 11c in the inner ring 11 as shown in FIG. 14A. In this case, as in the above-described embodiments, pins 18 of the cage 14 are arranged radially outward of the center lines X of the rolling elements 13. On the other hand, in a fifth embodiment of the invention described below (and its modified example), for example, as shown in FIG. 14B, the cage 14 according to the invention is applied to a rolling bearing (cylindrical roller bearing) 10 in which the outer ring 12 has rib portions 12b, 12c. In this case, pins 18 of the cage 14 are arranged radially inward of the center lines X of the rolling elements 13. As shown in FIG. 14A and FIG. 14B, in the cage 14 that is used in the cylindrical roller bearing 10, each pin 18 may be formed in a cylindrical shape.

Figure 12:
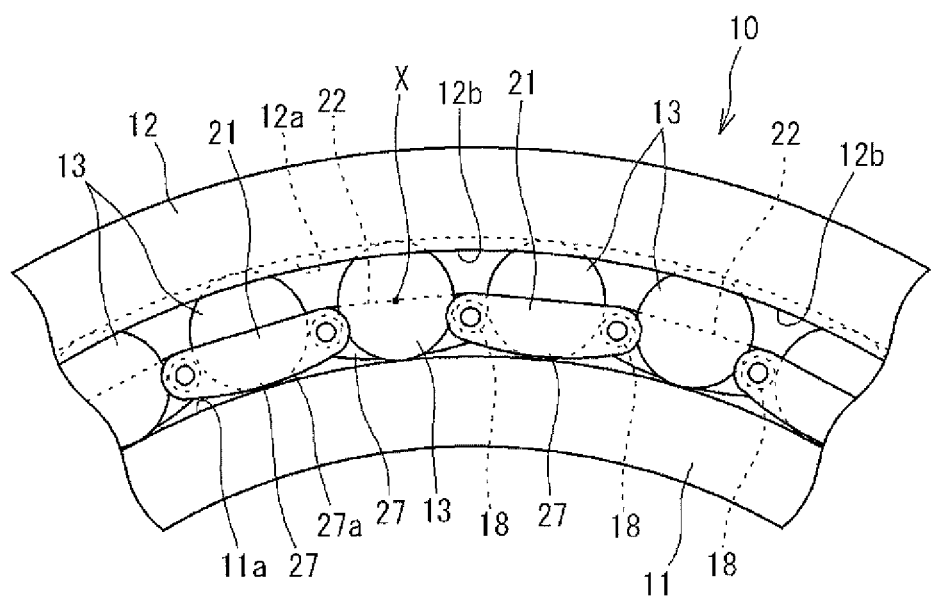
FIG. 12 is a side view of part of a rolling bearing according to a fifth embodiment of the invention.

FIG. 12 is a side view of part of a rolling bearing according to a fifth embodiment of the invention. In the cage 14 that is used in the rolling bearing 10, pins 18 are arranged radially inward of the center lines X of the rolling elements 13. In addition, the guided portions 27 that bulge (project) toward the inner ring 11 are formed at the radially inner side portions of the coupling links 21, 22. The radially inner-side sliding surfaces 27a of the guided portions 27 slide with respect to the inner ring raceway 11a. Thus, radially inward movement of the coupling links 21, 22 is restricted.

In addition, because radially inward movement of the coupling links 21, 22 is restricted by the guided portions 27, radially outward movement of other coupling links 21, 22 that are located at positions offset from the above-mentioned coupling links 21, 22 by 180° is restricted. In addition, radially outward movement of the pins 18 is restricted by the rolling elements 13. Therefore, in the present embodiment as well, the degree of freedom of movement of the cage 14 is reduced. As a result, it is possible to suppress occurrence of vibrations due to rotation of the rolling bearing 10.

Figure 13:
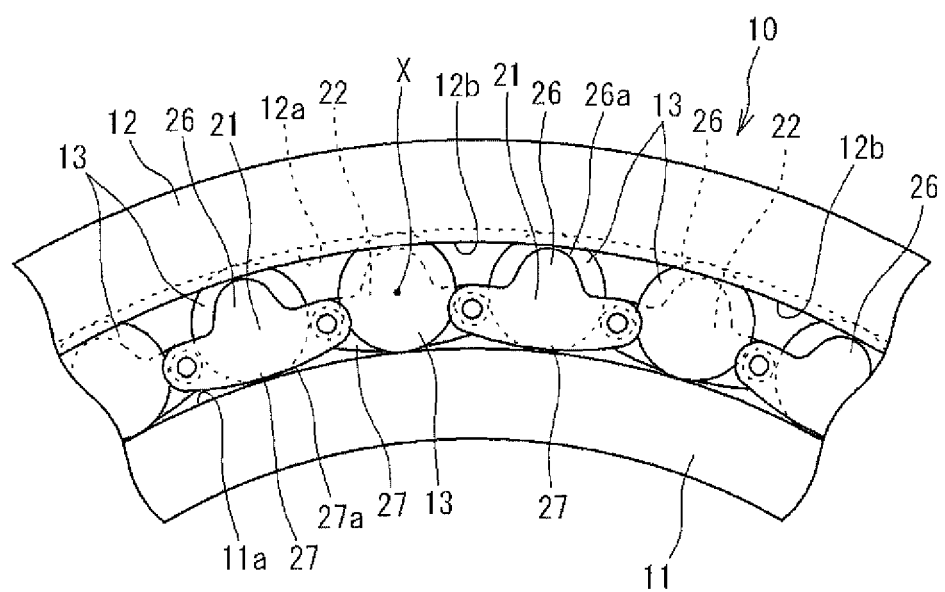
FIG. 13 is a side view of part of a rolling bearing according to a modified example of the fifth embodiment of the invention.

FIG. 13 is a side view of part of a rolling bearing according to a modified example of the fifth embodiment of the invention. In the fifth embodiment shown in FIG. 12, the guided portions 27 that constitute the movement restricting unit are formed at the radially inner portions of the coupling links 21, 22. However, in the present modified example, the movement restricting unit has, in addition to the guided portions 27, the guided portions 26 formed at the radially outer portions of the coupling links 21, 22. The guided portions 26 project toward the outer ring 12. The distal end (radially outer end) of each guided portion 26 is formed in a circular arc shape. The guided portions 26 are arranged with slight clearances left between the guided portions 26 and the rib portions 12b, 12c of the outer ring 12. The distal end surfaces of the guided portions 26 serve as the sliding surfaces 26a that are slidable with respect to the rib portions 12b, 12c of the outer ring 12.

According to the present modified example, the sliding surfaces 26a of the guided portions 26 slide with respect to the inner peripheries of the rib portions 12b, 12c of the outer ring 12. In this way, radially outward movement of the coupling links 21, 22 is restricted. Thus, it is possible to further reliably suppress occurrence of vibrations due to rotation of the rolling bearing 10. The coupling links 21, 22 are arranged so as to be farther from the outer ring 12 than from the inner ring 11. Therefore, each guided portion 26 has a larger radial size than that of each guided portion 27. However, each guided portion 26 has a smaller circumferential size than that of each guided portion 27. Thus, it is possible to suppress an increase in the weight of the coupling links 21, 22 due to formation of the guided portions 26.

In the present modified example, only the guided portions 26 may be formed in the coupling links 21, 22 and the guided portions 27 may be omitted.

Figure 15:
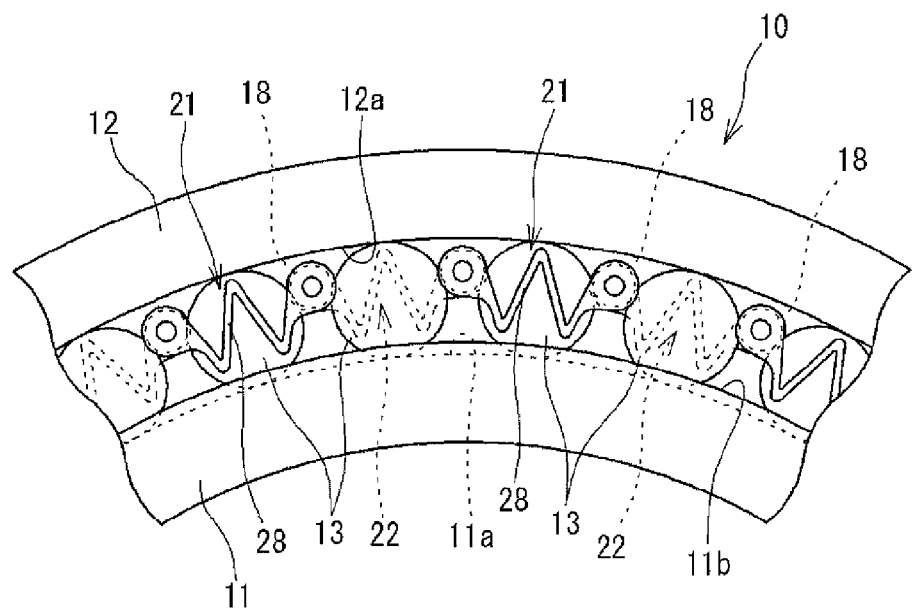
FIG. 15 is a side view of part of a rolling bearing according to a sixth embodiment of the invention.

FIG. 15 is a side view of part of a rolling bearing according to a sixth embodiment of the invention. In the present embodiment, the configuration of the movement restricting unit that restricts radial movement of the cage 14 is different from those of the above-described embodiments. Specifically, the movement restricting unit includes the coupling links 21, 22 configured to be elastically deformable (stretchable) in the circumferential direction of the rolling bearing 10. The coupling links 21, 22 each has an elastic portion 28 formed in a substantially accordion shape (zigzag shape) at its middle portion in the circumferential direction. The coupling links 21, 22 are configured to be stretchable in the circumferential direction through elastic deformation of the elastic portions 28. The coupling links 21, 22 may be fanned of a synthetic resin or a metal.

In the rolling bearing 10, pins 18 are arranged radially outward of the center lines X (see FIG. 1) of the rolling elements 13. The coupling links 21, 22 are slightly stretched in the circumferential direction and assembled, in this state, to the rolling bearing 10. Therefore, the pins 18 coupled to respective ends of each of the coupling links 21, 22 are pressed against the outer peripheries of the corresponding rolling elements 13 with no gaps, by the urging force that acts in such a direction that the coupling links 21, 22 contract. Thus, radial movement of the cage 14 is restricted, and occurrence of vibrations is suppressed.

The pins 18 are rotatably coupled to the coupling links 21, 22. Therefore, even when the pins 18 are pressed against the outer peripheries of the corresponding rolling elements 13, friction resistance does not significantly increase. Therefore, it is possible to suppress the rotation resistance of the rolling bearing 10 and abrasion of the rolling elements 13 and the pins 18. In addition, each of the coupling links 21, 22 has the elastic portion 28. Therefore, when an impact in the circumferential direction is applied to the cage 14 due to rotation of the rolling bearing 10, the impact is absorbed by the elastic portions 28.

When the cage 14 rotates due to the rotation of the rolling bearing 10, the coupling links 21, 22 stretch due to the centrifugal force, and the pins 18 may be removed from the rolling elements 13. If the pins 18 are removed from the rolling elements 13, radial movement of the cage 14 increases, which causes vibrations. Therefore, it is desirable that pressing force for pressing the pins 18 against the corresponding rolling elements 13 be larger than the centrifugal force that is applied to the cage 14.

In order to make the pressing force F for pressing the pins 18 against the corresponding rolling elements 13 larger than the centrifugal force that is applied to the cage 14, the pressing force F may be set on the basis of the following equation.

$$F > mr\omega^2$$

Here, m is the mass of the cage 14, r is the radial distance between the position of each pin 18 and the axis of the rolling bearing 10, and ω is the rotation angular velocity of the cage 14. Note that r may be the radial distance between the center of gravity of each of the coupling links 21, 22 and the axis of the rolling bearing 10. In addition, the rotation angular velocity ω may be a rotation angular velocity at rated output or a rotation angular velocity at an assumed maximum number of revolutions.

Figure 8:
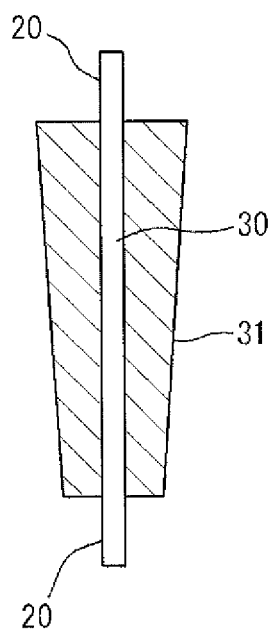
FIG. 8 is a sectional view that shows a modified example of a pin (rod member) in a cage according to the third embodiment of the invention.
Figure 9:
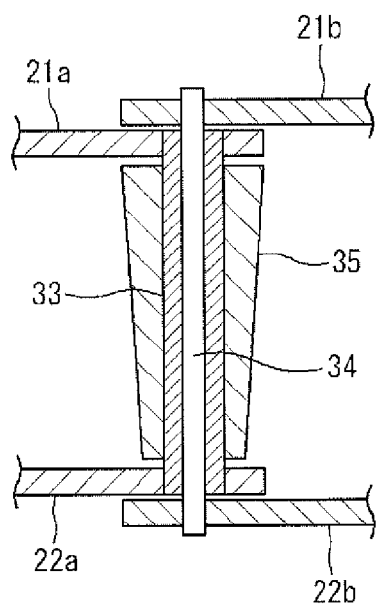
FIG. 9 is a sectional view that shows a cage according to a modified example of the third embodiment of the invention.

The invention is not limited to the above-described embodiments, and various modifications and changes may be made within the scope of the invention recited in the appended claims. For example, each pin 18 of the cage 14 need not be configured to be entirely rotatable, and only the outer peripheral portion of each pin 18 may be configured to be rotatable. For example, as shown in FIG. 8, each pin 18 may have a structure in which a rotatable roller 31 is provided on the outer periphery of a core member 30 having the shaft portions 20 at respective ends. As a modified example of the third embodiment, as shown in FIG. 9, there may be employed a structure in which a core member 34 that couples the outer coupling links 21b, 22b to each other is pivotably passed through a cylindrical bush 33 that couples the inner coupling links 21a, 22a to each other and a roller 35 is rotatably fitted to the outer periphery of the cylindrical bush 33, that is, a general roller-chain structure.

The body portion 19 (including the roller 31 in FIG. 8 or the roller 35 in FIG. 9) of each pin 18 may be formed in a cylindrical shape having a constant outside diameter. In addition, the body portion 19 of each pin 18 may be fanned in a tapered shape in which the diameter of a large end side of the tapered roller is large and the diameter of a smaller end side of the tapered roller is small. In addition, the body portion 19 of each pin 18 may be formed in a rectangular shape in cross section, and a portion that contacts corresponding two of the rolling elements 13 may be formed in a circular arc surface formed along the outer periphery of the rolling element 13. In this case, each pin 18 does not rotate when the pin 18 contacts corresponding two of the rolling elements 13, and slides with respect to corresponding two of the rolling elements 13.

The invention is not limited to the rolling bearing 10 used to support the main shaft of the wind power generator, and may be applied to the rolling bearing 10 that is used in any devices. In addition, each rolling element 13 in the rolling bearing 10 according to the invention is not limited to the tapered roller shown in FIG. 1 or the cylindrical roller shown in FIG. 14, and may be a barrel roller or a ball.

In the fourth and fifth embodiments, the guided portions 26, 27 need not be formed in all the coupling links 21, 22. Alternatively, for example, the guided portions 26, 27 may be formed in every other coupling links 21, 22. In addition, the guided portions 26, 27 may be formed in the coupling links 21, 22 as shown in FIG. 5 and FIG. 6. In addition, in the sixth embodiment, the elastic portions 28 need not be formed in all the coupling links 21, 22. Alternatively, for example, the elastic portions 28 may be formed in every other coupling links 21, 22.

Figure 16:
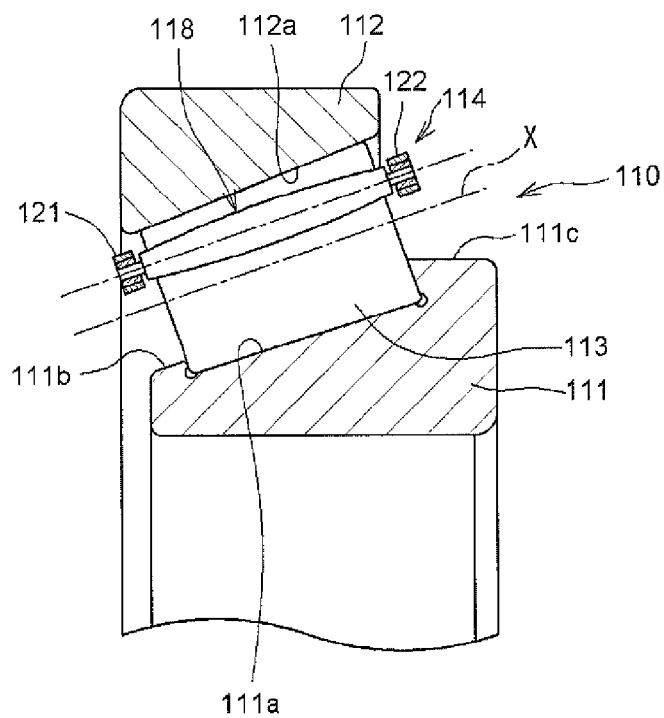
FIG. 16 is an axial sectional view of part of a rolling bearing according to a seventh embodiment of the invention.
Figure 17:
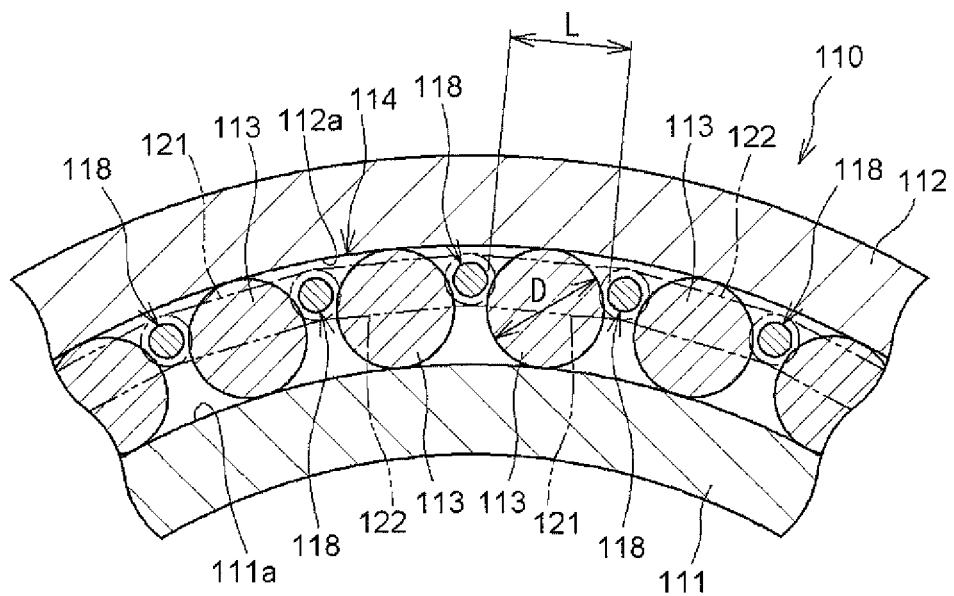
FIG. 17 is a cross-sectional view of part of the rolling bearing according to the seventh embodiment of the invention.

FIG. 16 is an axial sectional view of part of a rolling bearing 110 according to a seventh embodiment of the invention. FIG. 17 is a cross-sectional view of part of the rolling bearing. The rolling bearing 110 according to the present embodiment is used to support, for example, the main shaft of the wind power generator. The rolling bearing 110 includes an annular inner ring 111, an annular outer ring 112, a plurality of rolling elements 113 and a cage 114. The outer ring 112 is arranged radially outward of the inner ring 111. The rolling elements 113 are arranged in the circumferential direction, at positions between the inner ring 111 and the outer ring 112. The cage 114 maintains the intervals between the rolling elements 113 arranged in the circumferential direction.

The inner ring 111 has an inner ring raceway 111a, a small rib portion 111b and a large rib portion 111c. The inner ring raceway 111a is formed in a tapered shape. The small rib portion 111b and the large rib portion 111c are formed on respective axial sides of the inner ring raceway 111a, and protrude radially outward. The outer ring 112 has an outer ring raceway 112a formed in a tapered shape. Each of the rolling elements 113 is a tapered roller formed in truncated cone shape, and is rollable on the inner ring raceway 111a and the outer ring raceway 112. An axial movement of the rolling elements 113 is restricted by the small rib portion 111b and the large rib portion 111c.

Figure 18:
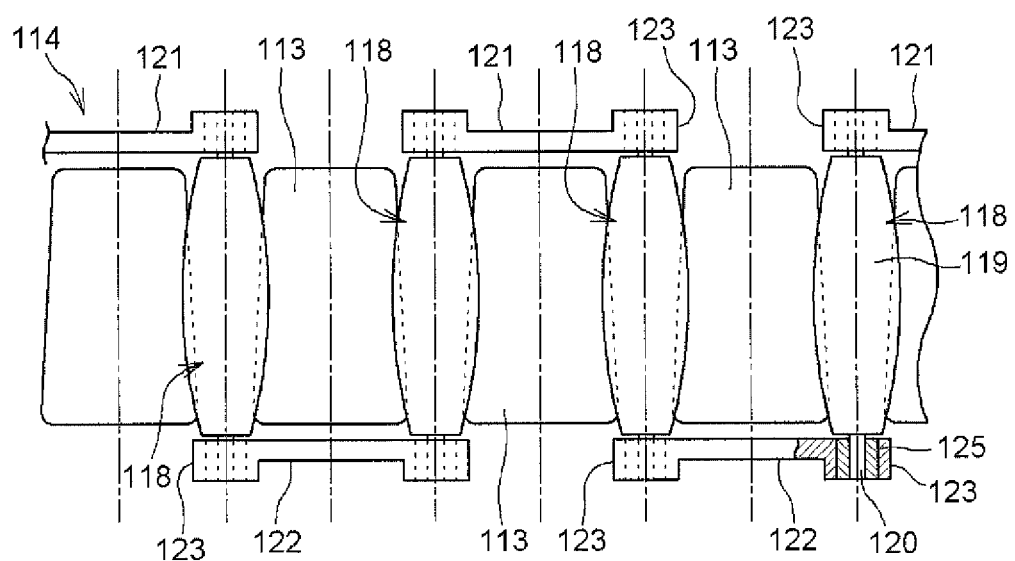
FIG. 18 is a plan view for illustrating the relationship between tapered rollers and a cage according to the seventh embodiment of the invention.
Figure 19:
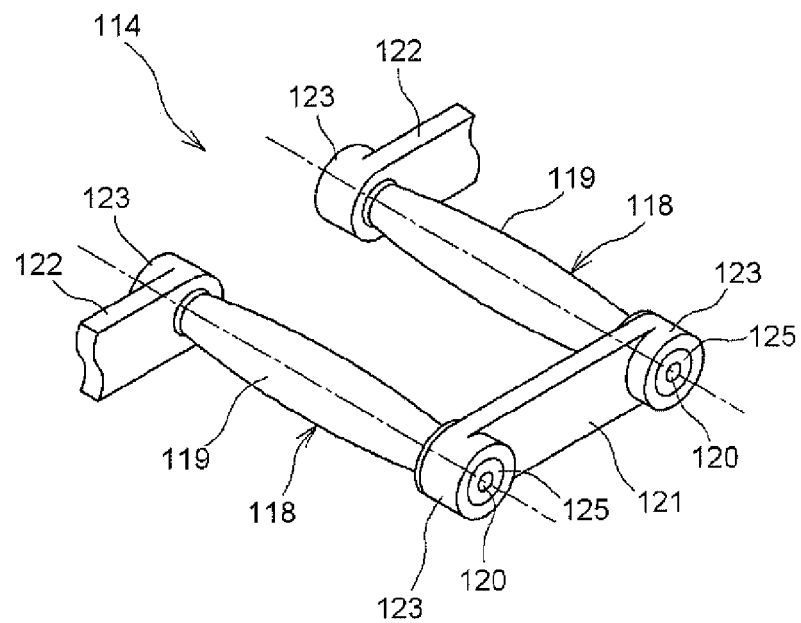
FIG. 19 is a partial perspective view of the cage according to the seventh embodiment of the invention.

FIG. 18 is a plan view that illustrates the relationship between the rolling elements and the cage. FIG. 19 is a partial perspective view of the cage. The cage 114 includes a plurality of pins (rod members) 118 and a plurality of coupling links (coupling members) 121, 122. The pins 118 are arranged between the rolling elements 113 arranged in the circumferential direction. Each of the coupling links 121, 122 couples the pins 118 that are adjacent to each other in the circumferential direction. The cage 114 is formed in an annular shape as a whole. Each of the pins 118 has an elongate body portion 119 that extends in the axial direction, and shaft portions 120 formed at respective axial ends of the body portion 119.

The body portion 119 has a curved outer periphery that bulges (projects) radially outward in a circular arc shape. Therefore, the outside diameter of the body portion 119 is small at both axial ends and is large at the axial center. The shaft portions 120 are formed so as to be coaxial with the body portion 119 and smaller in outside diameter than the body portion 119. As shown in FIG. 16, in the rolling bearing 110, the pins 118 are arranged radially outward of the centers (axes) X of the rolling elements (tapered rollers) 113 arranged between the inner ring 111 and the outer ring 112. In addition, as shown in FIG. 17, a minimum distance L between any two of the pins 118, which are adjacent to each other in the circumferential direction, is substantially equal to or slightly smaller than a diameter D of the rolling element 113 arranged therebetween, and the minimum distance L is set to such a value that a slight clearance is formed between the rolling element 113 and each of the two pins 118.

As shown in FIG. 18 and FIG. 19, the coupling links 121, 122 include first coupling links 121 and second coupling links 122. Each of the first coupling links 121 couples the one longitudinal (axial) end portions of the adjacent pins 118. Each of the second coupling links 122 couples the other longitudinal end portions of the adjacent pins 118. The first coupling links 121 and the second coupling links 122 are arranged alternately in the circumferential direction. Thus, the first coupling link 121 is coupled to the one end portion of each pin 118, and the second coupling link 122 is coupled to the other end portion of each pin 118.

Each of the first coupling links 121 and the second coupling links 122 is formed of a substantially ellipsoidal plate member, and has cylindrical boss portions 123 at its respective longitudinal end portions. The shaft portion 120 is rotatably inserted in each boss portion 123 via a bush 125. The first and second coupling links 121, 122 that are adjacent to each other in the circumferential direction, that is, in the present embodiment, the first coupling link 121 coupled to the one longitudinal end of one of the pins 118 and the second coupling link 122 coupled to the other longitudinal end portion of the one of the pins 118, are pivotable about the axis of the one of the pins 118 (i.e., the relative angle between the first coupling link 121 and the second coupling link 122 is adjustable). Thus, the shape of the cage 114 is changed as the coupling links 121, 122 pivot about the axis of each pin 118. Each boss portion 123 according to the present embodiment protrudes outward in the axial direction of the pin 118, and is located axially outward of the longitudinal center portion of a corresponding one of the coupling links 121, 122. A protruding amount of each boss portion 123 is substantially equal to the axial thickness of the longitudinal center portion of a corresponding one of the coupling links 121, 122. By making each boss portion 123 protrude in the axial direction in this way, it is possible to increase the length of a joint between the shaft portion 120 of each pin 118 and the boss portion 123 as much as possible. Therefore, the pins 118 and the coupling links 121, 122 are less likely to be removed from each other.

The cage 114 according to the present embodiment includes the pins 118 and the coupling links 121, 122. The pins 118 are arranged between the rolling elements 113 arranged in the circumferential direction. Each of the coupling links 121, 122 couples the pins 118 that are adjacent to each other in the circumferential direction. Thus, the intervals between the rolling elements 113 are appropriately maintained by the pins 118. Because each pin 118 is rotatably coupled to the coupling links 121, 122, it is possible to reduce friction resistance due to contact with the rolling elements 113. As a result, it is possible to suppress abrasion of the rolling elements 113 and pins 118.

The cage 114 is formed in an annular shape as a whole. Therefore, during assembly of the rolling bearing 110, the cage 114 is less likely to be removed from the outer periphery of the inner ring 111. As a result, the rolling elements 113 retained by the cage 114 are less likely to be removed from the inner ring 111. In the cage 114, the first coupling links 121 and the second coupling links 122 are provided alternately in the circumferential direction. Thus, the number of the coupling links 121, 122 is smaller than that in the case where the first coupling links 121 are consecutively provided in the circumferential direction and the second coupling links 122 are consecutively provided in the circumferential direction (in the case of an eighth embodiment described later). As a result, it is possible to reduce the weight of the rolling bearing and the cost for the rolling bearing.

In the rolling bearing 110, the pins 118 are arranged radially outward of the axes (centers) of the tapered rollers, and the minimum distance L between the pins 118 adjacent to each other in the circumferential direction is substantially equal to or smaller than the diameter D of the rolling element 113 arranged therebetween. Thus, during assembly of the rolling bearing 110, the rolling elements 113 and the pins 118 are retained with the rolling elements 113 fitted to the inner ring 111 even if the outer ring 112 is not mounted.

In each of the pins 118 according to the present embodiment, the outer periphery of the body portion 119 is formed in a curved shape that bulges (projects) radially outward in a circular arc shape. Therefore, each body portion 119 is in point contact with the outer peripheries (rolling surfaces) of corresponding two of the rolling elements 113. In other words, each pin 118 has a contact portion that is in point contact with the outer peripheries of corresponding two of the rolling elements 113. In this way, by bringing the outer periphery of each body portion 119 into point contact with the outer peripheries of corresponding two of the rolling elements 113, the following operation and advantageous effects are obtained.

That is, during rotation of each rolling element 113 that is a tapered roller, the circumferential velocity differs between a large-diameter portion and a small-diameter portion of the rolling element 113. Thus, if the outer periphery of each body portion 119 is in line contact with the outer peripheries of corresponding two of the rolling elements 113, there may occur a slip due to a difference in circumferential velocity, between the contact surfaces of the body portion 119 and the rolling elements 113. This slip may cause abrasion of the pins 118 and rolling elements 113. In this respect, in the present embodiment, because the outer periphery of the body portion 119 in each pin 118 is formed in a curved shape and is bulged in a circular arc shape, and is in point contact with the outer periphery of each of corresponding two of the rolling elements 113 at one point, the above-described slip is less likely to occur. Therefore, it is possible to suppress occurrence of abrasion of the pins 118 and the rolling elements 113.

Each body portion 119 according to the present embodiment is in point contact with substantially the axial center portions of corresponding two of the rolling elements 113. If each body portion 119 is in point contact with the axial end portions of corresponding two of the rolling elements 113, a load is concentrated on one end portion of the pin 118 when a load or impact in the circumferential direction is applied from the rolling elements 113. Therefore, a large load acts on the joint between the pin 118 and one of the corresponding coupling links 121, 122. Therefore, by bringing each body portion 119 into point contact with substantially the axial center portions of corresponding two of the rolling elements 113 as in the present embodiment, it is possible to receive a load or impact in the circumferential direction in a balanced manner.

Each contact portion that is in point contact with corresponding two of the rolling elements 113 may be formed by making only part of the body portion 119 in the longitudinal direction bulge outward in the radial direction. In addition, a plurality of the contact portions (two contact portions, for example) may be formed in the body portion 119 so as to be arranged in the longitudinal direction of the body portion 119. However, as in the present embodiment, by making the outer periphery of each body portion 119 bulge in a circular arc shape as a whole to form the contact portion, it is possible to simplify the shape of each contact portion and to easily manufacture each contact portion. In addition, because there is no steep change in the cross section of each body portion 119, it is possible to suppress stress concentration.

In the present embodiment, by adjusting the number of the pins 118 and the number of the coupling links 121, 122, it is possible to form the cages 114 having different outside diameters. Thus, it is possible to achieve commonality of the pins 118 and coupling links 121, 122 among the rolling bearings 110 that have different outside diameters and that include the common rolling elements 113. Thus, it is possible to reduce the manufacturing cost.

To assemble the rolling bearing 110 according to the present embodiment, for example, one of the pins 118 of the cage 114 and the coupling link 121 or 122 coupled to the one of the pins 118 are separated from each other to form the cage 114 into a linear shape (strap shape), and then the cage 114 is wound around the outer periphery of the inner ring 111 while the rolling elements 113 are sequentially arranged on the inner ring raceway 111a. Finally, by coupling the pin 118 and the coupling link 121 or 122, which have been separated from each other, to form the cage 114 into an annular shape, the rolling elements 113 and the cage 114 are mounted on the inner ring 111. After that, by arranging the outer ring 112 on the radially outer side of the rolling elements 113, the rolling bearing 110 is completed.

Figure 20:
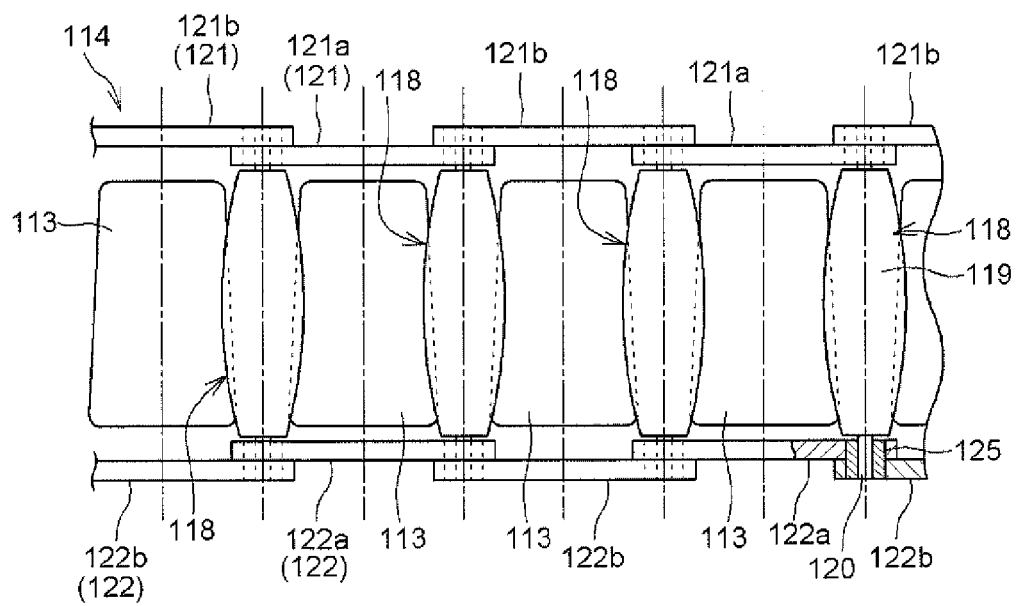
FIG. 20 is a plan view for illustrating the relationship between tapered rollers and a cage according to an eighth embodiment of the invention.
Figure 21:
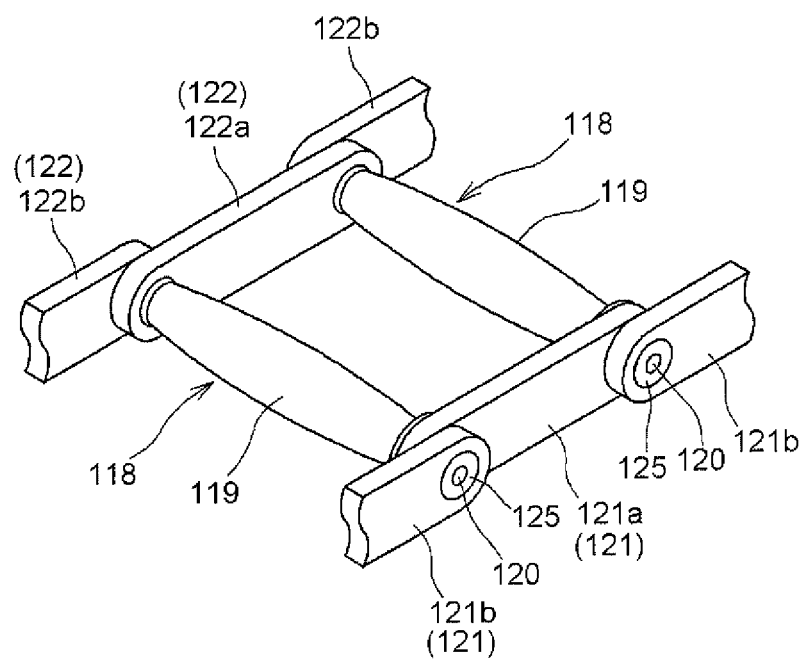
FIG. 21 is a partial perspective view of the cage according to the eighth embodiment of the invention.

FIG. 20 is a plan view that illustrates the relationship between rolling elements and a cage according to an eighth embodiment of the invention. FIG. 21 is a partial perspective view of the cage. In the present embodiment, the first coupling links 121 coupled to one longitudinal end portions of the pins 118 are provided consecutively in the circumferential direction and the second coupling links 122 coupled to the other longitudinal end portions of the pins 118 are provided consecutively in the circumferential direction. The first coupling links 121 include inner coupling links 121a and outer coupling links 121b arranged axially outward of the inner coupling links 121a. The second coupling links 122 include inner coupling links 122a and outer coupling links 122b arranged axially outward of the inner coupling links 122a. The inner coupling links 121a, 122a and the outer coupling links 121b, 122b are arranged alternately in the circumferential direction. In addition, the inner coupling links 121a of the first coupling links 121 and the inner coupling links 122a of the second coupling links 122 are arranged to face each other in the axial direction. The outer coupling links 121b of the first coupling links 121 and the outer coupling links 122b of the second coupling links 122 are arranged to face each other in the axial direction. One of the shaft portions 120 of each pin 118 is rotatably inserted in the corresponding inner coupling link 121a and the corresponding outer coupling link 121b via the bush 125. The other one of the shaft portions 120 of each pin 118 is rotatably inserted in the corresponding inner coupling link 122a and the corresponding outer coupling link 122b via the bush 125. Because the other configuration is similar to that of the seventh embodiment, like reference numerals are assigned and the detailed description thereof is omitted.

In the present embodiment, the first and second coupling links 121, 122 are respectively arranged consecutively in the circumferential direction. Therefore, it is possible to make the strength of the cage 114 according to the eighth embodiment higher than that of the cage 114 according to the seventh embodiment. On the other hand, the number of the coupling links 121, 122 is twice as large as that in the seventh embodiment, resulting in an increase in the weight of the rolling bearing and an increase in the cost for the rolling bearing. Therefore, in this respect, the seventh embodiment is advantageous over the eighth embodiment.

Figure 22:
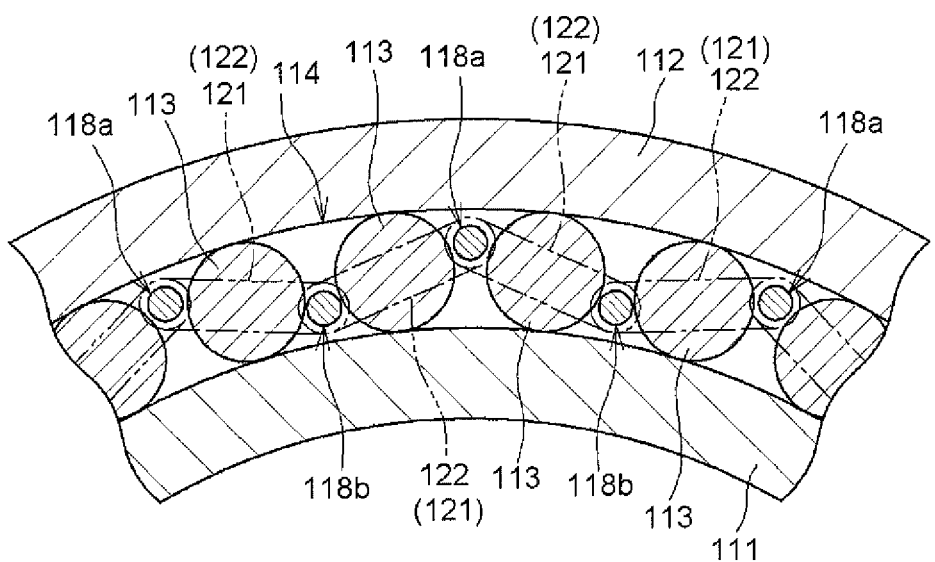
FIG. 22 is a cross-sectional view of part of a rolling bearing according to a ninth embodiment of the invention.

FIG. 22 is a cross-sectional view of part of a rolling bearing according to a ninth embodiment of the invention. The cage 114 according to the present embodiment includes pins (outer pins) 118a and pins (inner pins) 118b that are arranged alternately in the circumferential direction. The outer pins 118a are arranged radially outward of the centers of the tapered rollers 113, and the inner pins 118b are arranged radially inward of the centers of the tapered rollers 113. The first coupling links 121 and the second coupling links 122 are arranged in a zigzag manner in the radial direction. The first coupling links 121 and the second coupling links 122 may be provided alternately in the circumferential direction as in the seventh embodiment or may be respectively provided consecutively in the circumferential direction as in the eighth embodiment. The other configuration is similar to those of the above-described embodiments, so the detailed description thereof is omitted.

The invention is not limited to the above-described embodiments, and various modifications and changes may be made within the scope of the invention recited in the appended claims. For example, each pin 118 of the cage 114 need not be configured to be entirely rotatable, and only the outer peripheral portion of each pin 118 may be configured to be rotatable. For example, as shown in FIG. 23, each pin 118 may have a structure in which a rotatable roller 131 is provided on the outer periphery of a core member 130 having the shaft portions 120 at respective ends.

Figure 24:
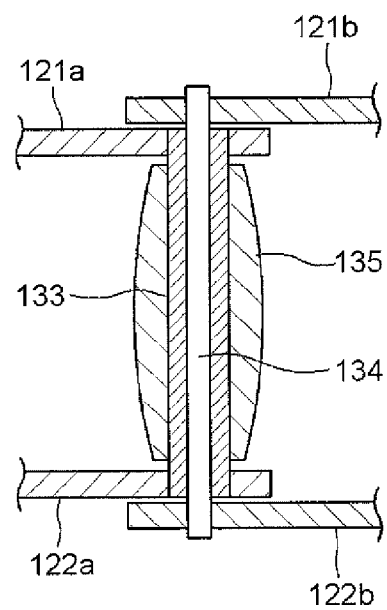
FIG. 24 is a sectional view that shows a cage according to a modified example of the eighth embodiment.

As a modified example of the eighth embodiment, as shown in FIG. 24, there may be employed a structure in which a core member 134 that couples the outer coupling links 121b, 122b to each other is pivotably passed through a cylindrical bush 133 that couples the inner coupling links 121a, 122a to each other and a roller 135 is rotatably fitted to the outer periphery of the cylindrical bush 133, that is, a general roller-chain structure.

Figure 23:
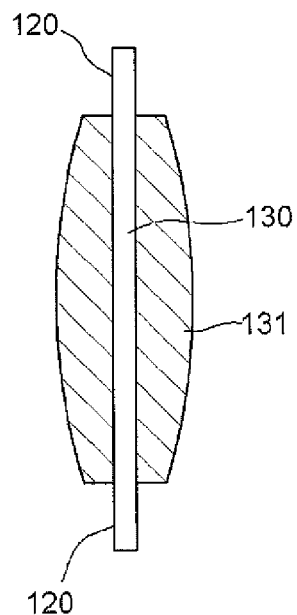
FIG. 23 is a sectional view that shows a modified example of a pin (rod member) in the cage.

Each roller 131 shown in FIG. 23 and each roller 135 shown in FIG. 24 also include the contact portion that is in point contact with corresponding two of the rolling elements 113 and that are formed by making the outer periphery of the roller bulge in a circular arc shape. The invention is not limited to the rolling bearing 110 used to support the main shaft of the wind power generator, and may be applied to the rolling bearing 110 that is used in any devices. In addition, each rolling element 113 in the rolling bearing 110 according to the invention is not limited to a tapered roller, and may be a cylindrical roller.

As described above, the cage according to the invention includes the pins provided between the rolling elements arranged in the circumferential direction, and the coupling links, each of which couples the two pins that are adjacent to each other in the circumferential direction. However, the invention may be applied to a cage having another configuration. For example, the invention may be applied to a cage formed in an annular shape in the following manner. Through-holes are respectively formed in a plurality of rolling elements, pins are rotatably passed through the respective through-holes, and the two pins that are adjacent to each other in the circumferential direction are coupled by coupling links. With the thus configured cage, it is possible to form the whole cage in an annular shape that is continuous in the circumferential direction. Therefore, during assembly of the rolling bearing, the cage is less likely to be removed from the outer periphery of the inner ring. As a result, it is possible to facilitate the assembly of the rolling bearing. Furthermore, it is possible to make the whole cage compact by deforming the cage like a chain. As a result, it is possible to easily handle the cage, for example, it is possible to easily store and transport the cage. In addition, it is possible to change the length of the cage in the circumferential direction by adjusting the number of the coupling links or the number of the pins. Therefore, it is possible to enhance commonality of cage components among the rolling bearings having different outside diameters.

According to the invention, it is possible to provide a rolling bearing cage that contributes to facilitation of assembly of a rolling bearing, that is easily handled, for example, transported, and that allows commonality of cage components among rolling bearings having different outside diameters, and to provide a rolling bearing including the rolling bearing cage.

What is claimed is:

1. A rolling bearing cage, comprising:
   multiple rod members each of which is provided between adjacent two of multiple rolling elements that are arranged in a circumferential direction of a rolling bearing; and
   multiple coupling members each of which couples corresponding two of the rod members, which are adjacent to each other in the circumferential direction,
   a movement restricting unit that restricts radial movement of the coupling members and that includes guided portions, the guided portions being formed in respective coupling members and contacting a bearing ring of the rolling bearing to restrict radial movement of the coupling members, wherein
   each of the coupling members is configured to pivot about an axis of a corresponding one of the rod members, which is connected to the coupling member, the axis extending in a longitudinal direction of the rod member, such that a relative angle between corresponding two of the coupling members, which are adjacent to each other in the circumferential direction, is adjusted.

2. The rolling bearing cage according to claim 1, wherein at least an outer peripheral portion of each of the rod members is configured to rotate about the axis of the rod member.

3. The rolling bearing cage according to claim 2, wherein the rod members are arranged radially outward of rotation centers of the rolling elements.

4. The rolling bearing cage according to claim 2, wherein the coupling members include first coupling members, each of which couples longitudinal end portions of corresponding two of the rod members, which are adjacent to each other in the circumferential direction, and second coupling members, each of which couples other longitudinal end portions of the corresponding two of the rod members; and
   the first coupling members and the second coupling members are arranged alternately in the circumferential direction.

5. The rolling bearing cage according to claim 2, wherein a contact portion that is in point contact with rolling surfaces of corresponding two of the rolling elements is formed in an outer periphery of each of the rod members.

6. The rolling bearing cage according to claim 5, wherein each of the contact portions is formed by forming the outer periphery of the rod member into a circular arc surface that bulges radially outward.

7. The rolling bearing cage according to claim 6, wherein, in the rolling bearing, the rod members are arranged radially outward of rotation centers of the rolling elements.

8. The rolling bearing cage according to claim 5, wherein:
   the coupling members include first coupling members, each of which couples longitudinal end portions of corresponding two of the rod members, which are adjacent to each other in the circumferential direction, and second coupling members, each of which couples other longitudinal end portions of the corresponding two of the rod members; and
   the first coupling members and the second coupling members are arranged alternately in the circumferential direction.

9. The rolling bearing cage according to claim 1, wherein the rod members are arranged radially outward of rotation centers of the rolling elements.

10. The rolling bearing cage according to claim 1, wherein the coupling members include first coupling members, each of which couples longitudinal end portions of corresponding two of the rod members, which are adjacent to each other in the circumferential direction, and second coupling members, each of which couples other longitudinal end portions of the corresponding two of the rod members; and
    the first coupling members and the second coupling members are arranged alternately in the circumferential direction.

11. The rolling bearing cage according to claim 1, wherein each of the guided portions has a circular arc-shaped sliding surface that protrudes toward the bearing ring of the rolling bearing and that slides with respect to the bearing ring.

12. The rolling bearing cage according to claim 11, wherein each of the guided portions has a sliding surface that slides with respect to the bearing ring of the rolling bearing, and friction reducing treatment is applied to the sliding surface.

13. The rolling bearing cage according to claim 1, wherein each of the guided portions has a sliding surface that slides with respect to the bearing ring of the rolling bearing, and friction reducing treatment is applied to the sliding surface.

14. The rolling bearing cage according to claim 1, wherein:
    the movement restricting unit is formed by forming, in each of the coupling members, an elastic portion that is configured to be stretched in the circumferential direction of the rolling bearing through elastic deformation; and
    the rod members provided at respective end portions of each of the coupling members are pressed against an outer periphery of the corresponding rolling element by urging force of the elastic portion, which acts in such a direction that the elastic portion contracts.

15. A rolling bearing, comprising:
    an inner ring;
    an outer ring arranged radially outward of the inner ring;
    a plurality of rolling elements arranged in a circumferential direction, at positions between the inner ring and the outer ring; and
    the cage according to claim 1, which maintains intervals between the rolling elements in the circumferential direction.

16. A rolling bearing cage, comprising:
    multiple rod members each of which is provided between adjacent two of multiple rolling elements that are arranged in a circumferential direction of a rolling bearing;

multiple coupling members each of which couples corresponding two of the rod members, which are adjacent to each other in the circumferential direction; and a movement restricting unit that restricts radial movement of the coupling members and that is formed by forming, in each of the coupling members, an elastic portion that is configured to be stretched in the circumferential direction of the rolling bearing through elastic deformation, wherein the rod members provided at respective end portions of each of the coupling members are pressed against an outer periphery of the corresponding rolling element by urging force of the elastic portion, which acts in such a direction that the elastic portion contracts, and each of the coupling members is configured to pivot about an axis of a corresponding one of the rod members, which is connected to the coupling member, the axis extending in a longitudinal direction of the rod member, such that a relative angle between corresponding two of the coupling members, which are adjacent to each other in the circumferential direction, is adjusted.

* * * * *